(12) United States Patent
Tisch

(10) Patent No.: US 8,393,310 B2
(45) Date of Patent: Mar. 12, 2013

(54) MASS BALANCING MECHANISM

(75) Inventor: Siegfried Tisch, Gerlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 408 days.

(21) Appl. No.: 12/841,494

(22) Filed: Jul. 22, 2010

(65) Prior Publication Data
US 2011/0030643 A1 Feb. 10, 2011

(51) Int. Cl.
*F16C 3/20* (2006.01)
*F02B 75/06* (2006.01)

(52) U.S. Cl. ...................................... 123/192.2; 74/603
(58) Field of Classification Search ............... 123/192.2; 74/603
See application file for complete search history.

(56) References Cited

FOREIGN PATENT DOCUMENTS
EP 1775484 4/2007

*Primary Examiner* — Noah Kamen
(74) *Attorney, Agent, or Firm* — Volpe and Koenig, P.C.

(57) ABSTRACT

A mass balancing mechanism of an internal combustion engine, in which the mechanism includes a compensation shaft (1, 1') formed as a tubular carrier shaft (5, 5') having a mounting point (10, 10') for the radial mounting of the compensation shaft. The mechanism further includes an unbalanced mass (6) joined to the carrier shaft. A needle roller bearing (2) is used for a radial rolling bearing-mounting of the compensation shaft, with the needle rollers (11) of the needle roller bearing being in rolling contact with the mounting point which is configured as an inner raceway and possesses a width which is variable in peripheral direction, so that, in a region situated diametrically opposite a load zone in whose peripheral region the inner raceway is loaded by the radial load of the unbalanced mass which rotates together with the compensation shaft, a width (14) of the inner raceway is smaller than the length of the needle rollers and tapers clearly or is interrupted in peripheral direction. The tapering or interruption of the inner raceway is produced by one or more trough-shaped depressions (15, 15') formed locally in the carrier shaft.

6 Claims, 2 Drawing Sheets

MASS BALANCING MECHANISM

CROSS-REFERENCE TO RELATED APPLICATIONS

This application claims the benefit of German Patent Application No. 102009036794.2, filed Aug. 8, 2009, which is incorporated herein by reference as if fully set forth.

BACKGROUND

The invention concerns a mass balancing mechanism for compensating mass forces and/or mass moments of inertia of an internal combustion engine. The mass balancing mechanism comprises a compensation shaft comprising a tubular carrier shaft comprising a mounting point configured on the outer periphery of the carrier for radial mounting of the compensation shaft in the internal combustion engine, and the mass balancing mechanism further comprising an unbalanced mass which is connected to the carrier shaft and joined to the carrier shaft on a connecting section of the carrier shaft extending laterally of the mounting point.

A mass balancing mechanism of the above-noted type is disclosed in an article "Der neue 1,8-I-Vierzylinder-Ottomotor von Mercedes-Benz" published in the Motortechnische Zeitschrift (MTZ), Issue of June 2009. The mass balancing mechanism comprises two compensation shafts rotating in opposed directions at double the speed of rotation of the crankshaft and serving to compensate free mass forces of the second order. These shafts are constructed as compensation shafts which comprise a tubular carrier shaft and are pushed into a mounting channel of the internal combustion engine and then screwed to two respective unbalanced masses.

The radial mounting of each of the compensation shafts is effected at three sliding bearing locations. It is well known that sliding bearing-mountings produce clearly higher friction work losses than rolling bearing-mountings, so that rolling bearing-mounted compensation shafts are being increasingly used in large series production. In addition, the pressure medium supply which is obligatory in hydrodynamic sliding bearings can be omitted, because, typically, the lubrication of rolling bearing-mountings is realized solely through the oil mist formed during operation, as has been proposed in EP 1 775 484 A2.

SUMMARY

The object of the present invention is to improve the construction of a mass balancing mechanism of the above-noted type, so that the operational friction work losses are clearly reduced compared to prior art sliding bearing-mountings and the level of the life fatigue strength of the mounting points is maintained or improved.

The above-noted objective is met by utilizing one or more features of the invention noted below and in the claims. According to the invention, the mass balancing mechanism comprises a needle roller bearing for a radial rolling bearing-mounting of a compensation shaft, needle rollers of the needle roller bearing being in rolling contact with the mounting point which is configured as an inner raceway. This inner raceway possesses a width which is variable in peripheral direction, so that, in a region situated diametrically opposite a load zone in whose peripheral region the inner raceway is loaded by the radial load of the unbalanced mass which rotates together with the compensation shaft, a width of the inner raceway is smaller than the length of the needle rollers and tapers clearly or is interrupted in peripheral direction. The taper or the interruption of the inner raceway is formed by one or more trough-shaped depressions formed locally in the carrier shaft.

In other words, the invention is not restricted only to replacing a sliding bearing-mounting of the compensation shaft with a low-friction roller bearing-mounting. Rather, according to further provisions of the invention, in the peripheral region situated opposite the load zone and loaded only slightly or not at all, the mounting point is either tapered or completely interrupted in peripheral direction through one or more trough-shaped depressions. In this way, the oil mist forming during operation can reach, without hindrance, the needle rollers situated locally with overhang or locally self-supporting above the inner raceway and, with a view to the required durability of the mounting, this guarantees an adequate lubrication and/or cooling of the rolling bearing-mounting.

According to a further development of the invention, the tapering of the inner raceway is realized through two preferably mirror symmetrical, trough-shaped depressions adjoining the inner raceway on both sides. In the alternative case of an interruption of the inner raceway—by this is to understood that the circumferential angle of the inner raceway is less than 360°—a single tunnel-like trough-shaped depression extending in longitudinal direction of the compensation shaft under the needle-roller bearing is sufficient and guarantees an adequate supply of oil mist to the self-supporting needle rollers in this region.

In another development of the invention preferred from the manufacturing point of view, the trough-shaped depressions are made via a cold shaping of the carrier shaft. Thus, when choosing the material for the carrier shaft consideration has to be given not only to the tribological loading of the inner raceway but also to the cold-shaping capacity of the material.

Preferably, the diameter of the inner raceway and the enveloping circle diameter of adjoining shaft sections are substantially equal to each other. Thus, the carrier shaft can be a precision steel tube having—with exception of the trough-shaped depression or depressions—a constant diameter over its entire length. Through the configuration of the mounting point without a radial shoulder in the peripheral region of the load zone (in other words, the mounting point is neither receded nor raised in this region), the radial design space requirement of the radial rolling bearing-mounting is minimized compared to a radially projecting bearing journal. With a view to a precision grinding finish of the inner raceway, it is still possible to provide such a bearing journal which, for obtaining a small design space requirement for the rolling bearing-mounting, is preferably only slightly raised relative to the adjoining shaft sections.

In addition, as seen in direction of the radial load, the trough-shaped depressions should have a substantially elliptical shape and extend over a circumferential angle of up to 180°. In order to retain the immobile compensation shaft centered in the needle roller bearing, this circumferential angle must not be exceeded. Whereas the elliptical shape is a result of a production-appropriate shaping of the carrier shaft, the free cross-section available for the transport of the oil mist to the locally overhanging needle rollers increases with the circumferential angle of the elliptical trough-shaped depression. Moreover, the eccentricity of the center of gravity of the carrier shaft in direction of the load zone increases with the magnitude of the circumferential angle, so that the unbalanced mass and, with it, the total weight of the compensation shaft can be reduced while keeping the unbalanced mass action constant.

BRIEF DESCRIPTION OF THE DRAWINGS

Further features of the invention result from the following description and the appended drawings in which exemplary embodiments of the invention are shown in simple illustrations. If not otherwise stated, similar or functionally similar features or components are identified by the same reference numerals. The figures show.

DETAILED DESCRIPTION OF THE PREFERRED EMBODIMENTS

Figure 1:
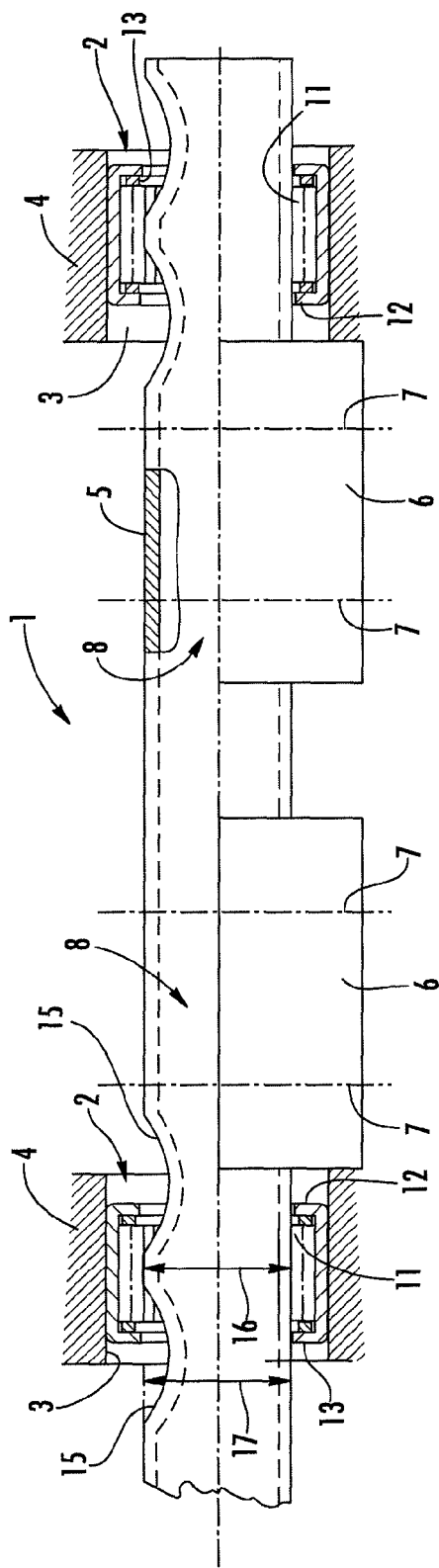
FIG. 1, a first embodiment of a needle roller bearing-mounted compensation shaft, in a partial cross-section in a longitudinal view.
Figure 2:
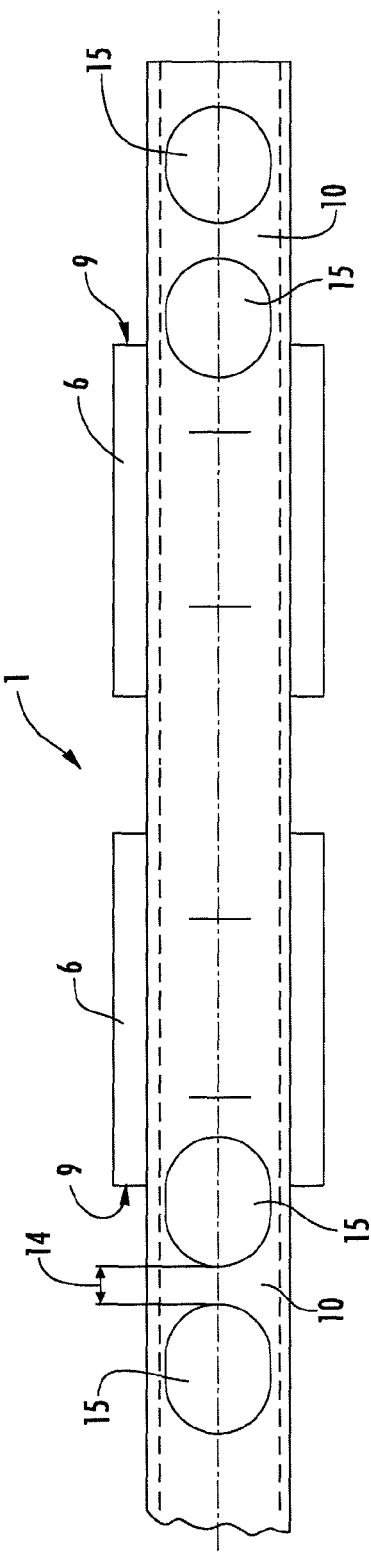
FIG. 2, the compensation shaft of FIG. 1 in a top view.

FIGS. 1 and 2 show a side view and a top view respectively, of two compensation shafts 1 which rotate in opposite directions at double the crankshaft speed and which, together with needle roller bearings 2 form a part of a mass compensating mechanism for compensating the free second order mass forces of an internal combustion engine. The compensation shaft 1, which is mounted via radially rolling bearings in the mounting channel 3 of an undivided housing 4 of the internal combustion engine, is comprised of a carrier shaft 5 made of a precision tube of rolled bearing steel and two unbalanced masses 6 joined to the carrier shaft 5, in the present case, through screwed connections. The figures show the screwing points 7. Screwing of the unbalanced masses 6 to matched connecting sections 8 of the carrier shaft 5 is performed after the carrier shaft 5 has been pushed into the mounting channel 3 because the enveloping circle diameter of the unbalanced masses 6 is larger than the mounting channel diameter. The front end surfaces 9 of the unbalanced masses 6 serve for positioning and axial mounting of the compensation shaft 1 in the housing 4.

The radial mounting of the compensation shaft 1 is realized at mounting points 10 which extend laterally of the connecting sections 8 and are configured on the periphery of the carrier shaft 5 as inner raceways for the needle rollers 11 of needle roller bearing 2 which does not possess an inner ring. The needle roller bearings 2, also called needle roller bushings, comprise a thin-walled, shaped outer ring 12 made without chip removal and a needle roller crown ring comprising the needle rollers 11 which are guided in a cage 12, with the bearings being pressed into the mounting channel 3 before the carrier shaft 5 is pushed in.

The load applied to the mounting points 10 is a so-called lumped load. In this type of loading, the radial load produced by the unbalanced masses 6 rotates with the compensation shaft 1 and loads the inner raceways 10 in the peripheral region of a load zone which is stationary or substantially immobile relative to the inner raceway 10. In contrast, the peripheral region situated diametrically opposite the load zone is not at all or hardly loaded. It is thus possible to make the inner raceways 10 with a variable width in the peripheral direction which is matched to the variable loading in peripheral direction. Specifically, this means that, in the peripheral region of the load zone, each inner raceway 10 is wider than the length of the needle rollers 11 and, in the peripheral region situated diametrically opposite the load zone, each inner raceway 10 is clearly tapered to a width 14 which is smaller than the length of the needle rollers 11.

Tapering of the inner raceways 10 to the width 14 is realized through laterally adjoining trough-shaped depressions 15 formed by cold shaping without chip removal locally in the carrier shaft 5 on each side of the inner raceways 10. As best seen in the top view of the compensation shaft 1 in FIG. 2, the trough-shaped depressions 15, which are mirror symmetric to the central transverse plane of the respective inner raceway 10, are substantially elliptical in shape when viewed in direction of the radial load and extend through a circumferential angle of approximately 100° which is symmetric to the unbalanced mass direction and extends on the low load-side of the mounting point 10.

The somewhat larger design space requirement of the rolling bearing-mounting compared to the prior art sliding-bearing mounting is limited in radial direction by the fact that the diameter 16 of the inner raceways 10 and the enveloping circle diameter 17 of adjoining shaft sections are substantially equal to each other.

The function of the trough-shaped depressions 15 is creating a sufficiently large cross-sectional area for transfer of oil mist which can flow in this way directly and in an adequate quantity to the needle rollers 11 locally overhanging the inner raceway 10. As known, the oil mist is formed during operation of the internal combustion engine in its crankcase in which the mass balancing mechanism is also arranged. Without such trough-shaped depressions 15, there would be a higher risk of wear of the rolling bearing-mounting due to deficient lubrication and/or cooling because, in this case, the oil mist would be able to penetrate into the needle roller bearing 2, at the most, through the annular gap between the outer ring 12 and the then cylindrical outer periphery of the carrier shaft 5.

Figure 3:
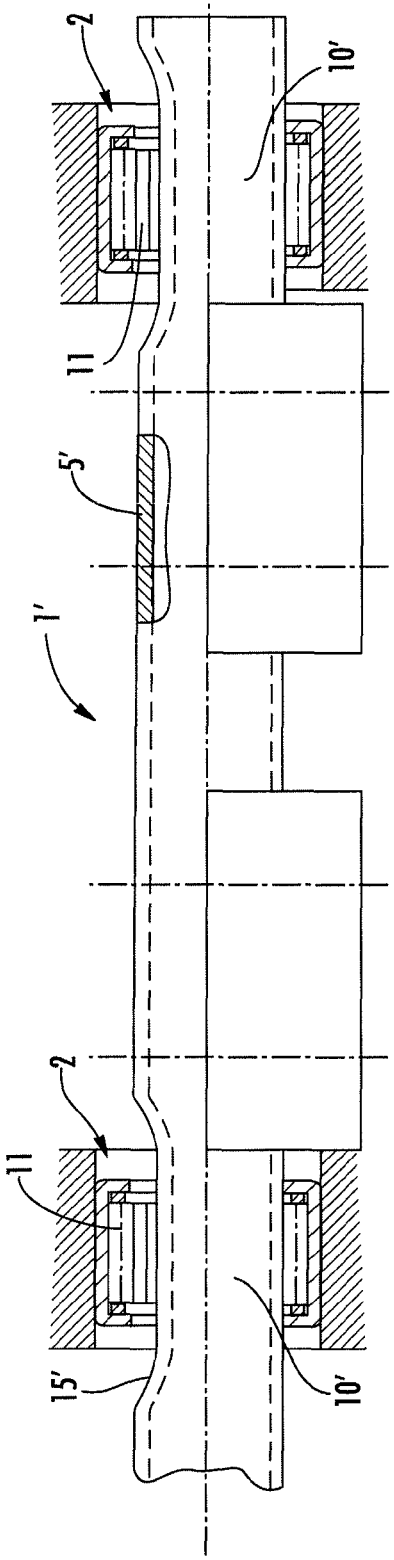
FIG. 3, a second embodiment of a needle roller bearing-mounted compensation shaft, in a partial cross-section in a longitudinal view, and FIG. 4, the compensation shaft of FIG. 3 in a top view.
Figure 4:
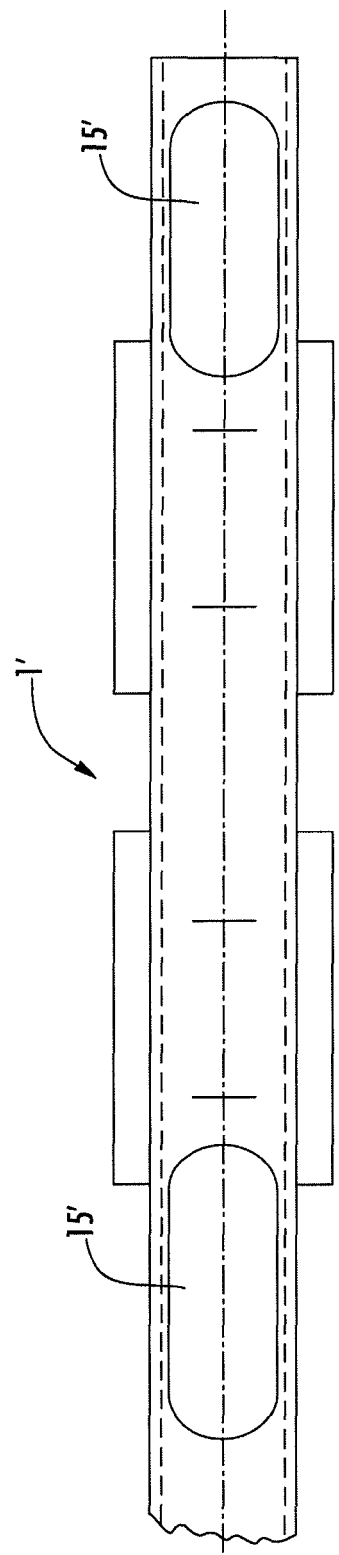

As disclosed in FIGS. 3 and 4 with a compensation shaft 1' and a carrier shaft 5', likewise represented in a side view and a top view, respectively, an alternative to the tapering inner raceways 10 is to interrupt the inner raceways 10' on the periphery, i.e. to make them with a raceway angle of less than 360°. An interruption is realized in this case through trough-shaped depressions 15' whose length is larger than the width of the needle roller bearing 2 and which extend with a tunnel-like configuration in longitudinal direction of the compensation shaft 1' under the needle roller bearing 2. In this way, the thus locally completely self-supporting needle rollers 11 are provided from both sides of the inner raceway 10' with an adequate quantity of oil mist.

Similar to the example of embodiment of FIGS. 1 and 2, the trough-shaped depressions 15' are somewhat elliptical in shape and extend through a circumferential angle of the carrier shaft 5' of approximately 100°.

LIST OF REFERENCE NUMERALS

1 Compensation shaft
2 Needle roller bearing
3 Mounting channel
4 Housing
5 Carrier shaft
6 Unbalanced mass
7 Screwing point
8 Connecting section
9 Front end surface of unbalanced mass
10 Mounting point/Inner raceway
11 Needle rollers
12 Outer ring
13 Cage
14 Width of the tapered inner raceway
15 Trough-shaped depression
16 Diameter of the inner raceway
17 Enveloping circle diameter

The invention claimed is:

1. A mass balancing mechanism for compensating mass forces and/or mass moments of inertia of an internal combustion engine, the mass balancing mechanism comprising a compensation shaft including a tubular carrier shaft comprising on an outer periphery, a mounting point for radial mounting of the compensation shaft in the internal combustion engine, an unbalanced mass which is connected to the carrier shaft and joined to the carrier shaft on a connecting section of the carrier shaft extending laterally of the mounting point, a needle roller bearing for a radial rolling bearing-mounting of the compensation shaft, needle rollers of the needle roller bearing being in rolling contact with the mounting point which is configured as an inner raceway, the inner raceway has a width which is variable in a peripheral direction, so that, in a region situated diametrically opposite a load zone in whose peripheral region the inner raceway is loaded by a radial load of the unbalanced mass which rotates together with the compensation shaft, a width of the inner raceway is smaller than a length of the needle rollers and tapers or is interrupted in the peripheral direction, the taper or interruption of the inner raceway comprising one or more trough-shaped depressions formed locally in the carrier shaft.

2. The mass balancing mechanism of claim 1, wherein the taper of the inner raceway includes two trough-shaped depressions adjoining the inner raceway on both sides.

3. The mass balancing mechanism of claim 2, wherein the two trough-shaped depressions are configured mirror symmetric to each other with regard to a central transverse plane of the inner raceway.

4. The mass balancing mechanism of claim 1, wherein the trough-shaped depressions are cold formed in the carrier shaft.

5. The mass balancing mechanism of claim 1, wherein a diameter of the inner raceway and an enveloping circle diameter of adjoining shaft sections are substantially equal to each other.

6. The mass balancing mechanism of claim 1, wherein, as viewed in a direction of the radial load, the trough-shaped depressions are substantially elliptical in shape and extend over a circumferential angle of up to 180°.

* * * * *